United States Patent
Arora et al.

(10) Patent No.: US 10,002,181 B2
(45) Date of Patent: *Jun. 19, 2018

(54) REAL-TIME TAGGER

(71) Applicant: International Business Machines Corporation, Armonk, NY (US)

(72) Inventors: Pritpal S. Arora, Bangalore (IN); Bijo S. Kappen, Bangalore (IN); Gopal S. Pingali, Mohegan Lake, NY (US)

(73) Assignee: International Business Machines Corporation, Armonk, NY (US)

(*) Notice: Subject to any disclaimer, the term of this patent is extended or adjusted under 35 U.S.C. 154(b) by 181 days.

This patent is subject to a terminal disclaimer.

(21) Appl. No.: 14/948,766

(22) Filed: Nov. 23, 2015

(65) Prior Publication Data

US 2017/0078138 A1    Mar. 16, 2017

Related U.S. Application Data

(63) Continuation-in-part of application No. 14/851,566, filed on Sep. 11, 2015.

(51) Int. Cl.
*G06F 15/16*    (2006.01)
*G06F 17/30*    (2006.01)
(Continued)

(52) U.S. Cl.
CPC .. *G06F 17/30598* (2013.01); *G06F 17/30525* (2013.01); *G06Q 10/00* (2013.01); *H04L 41/5074* (2013.01)

(58) Field of Classification Search
CPC ........ G06F 17/30598; G06F 17/30525; G06Q 10/00; H04L 41/5074
(Continued)

(56) References Cited

U.S. PATENT DOCUMENTS 5,386,515 A    1/1995    Martin et al.
6,735,597 B1    5/2004    Paradies
(Continued)

FOREIGN PATENT DOCUMENTS

EP    2498209 A1    2/2012
WO    2009076203 A1    6/2009
(Continued)

OTHER PUBLICATIONS

Mell et al., "The NIST Definition of Cloud Computing", NIST National Institute of Standards and Technology, US Department of Commerce, Special Publication 800-145, Sep. 2011, 7 pages.
(Continued)

*Primary Examiner* — David Lazaro
*Assistant Examiner* — Berhanu Shitayewoldetsadik
(74) *Attorney, Agent, or Firm* — Edward J. Wixted, III

(57) ABSTRACT

In an approach for providing tagging for problem resolution that works across multiple collaboration channels, a processor receives an indication of a problem statement. A processor monitors a collaboration channel for a new tag. A processor analyzes the new tag to determine a type of tag. A processor sends a notification of the new tag to the collaboration channel. A processor stores the new tag to a database of tags. A processor forms a cluster of correlated tags. A processor sends a notification of the cluster of correlated tags and a recommended action. A processor monitors the collaboration channel for an information request. A processor matches the information request with at least one tag in the database. A processor sends a notification of matches of the information request with the at least one tag found to the collaboration channel. A processor updates the tags with received information.

20 Claims, 6 Drawing Sheets

(51) Int. Cl.
*H04L 12/24* (2006.01)
*G06Q 10/00* (2012.01)

(58) Field of Classification Search
USPC .................................... 709/224, 225, 232
See application file for complete search history.

(56) References Cited

U.S. PATENT DOCUMENTS

| | | | |
|---|---|---|---|
| 7,200,592 B2 * | 4/2007 | Goodwin | G06F 17/30616 |
| | | | 706/46 |
| 7,298,867 B2 | 11/2007 | Slaski | |
| 7,543,047 B2 | 6/2009 | Park et al. | |
| 7,716,739 B1 | 5/2010 | McCorkendale | |
| 7,917,815 B2 | 3/2011 | Rapp et al. | |
| 8,200,527 B1 | 6/2012 | Thompson et al. | |
| 8,266,072 B2 | 9/2012 | Grace et al. | |
| 8,346,006 B1 | 1/2013 | Darbari et al. | |
| 8,352,870 B2 | 1/2013 | Bailor et al. | |
| 8,365,019 B2 | 1/2013 | Sailer et al. | |
| 8,473,432 B2 | 6/2013 | Anerousis et al. | |
| 8,572,022 B2 | 10/2013 | Hagan et al. | |
| 8,589,778 B2 | 11/2013 | Boyle et al. | |
| 8,635,283 B2 | 1/2014 | Vellanki et al. | |
| 8,639,650 B1 * | 1/2014 | Gill | G06N 5/04 |
| | | | 706/61 |
| 8,805,977 B2 | 8/2014 | Vemulapalli et al. | |
| 2002/0194047 A1 | 12/2002 | Edinger et al. | |
| 2003/0046308 A1 | 3/2003 | Weber et al. | |
| 2005/0086248 A1 | 4/2005 | Atchison | |
| 2005/0289168 A1 * | 12/2005 | Green | G06F 17/3064 |
| 2009/0063387 A1 | 3/2009 | Beaty et al. | |
| 2010/0057522 A1 | 3/2010 | Borowski et al. | |
| 2010/0262610 A1 * | 10/2010 | Acosta | G06F 17/30663 |
| | | | 707/748 |
| 2010/0318846 A1 | 12/2010 | Sailer et al. | |
| 2011/0208822 A1 * | 8/2011 | Rathod | G06Q 30/02 |
| | | | 709/206 |
| 2012/0226803 A1 * | 9/2012 | Bharadwaj | H04L 41/0253 |
| | | | 709/224 |
| 2013/0151948 A1 | 6/2013 | Khalil et al. | |
| 2013/0166550 A1 * | 6/2013 | Buchmann | G06F 17/30997 |
| | | | 707/736 |
| 2013/0197951 A1 | 8/2013 | Watson et al. | |
| 2013/0218783 A1 * | 8/2013 | Anand | G06Q 10/20 |
| | | | 705/304 |
| 2014/0149436 A1 * | 5/2014 | Bahrami | G06F 17/30867 |
| | | | 707/754 |
| 2014/0247460 A1 | 9/2014 | Gaertner et al. | |
| 2014/0279625 A1 | 9/2014 | Carter | |
| 2015/0032492 A1 | 1/2015 | Ting et al. | |
| 2015/0046643 A1 * | 2/2015 | Whelan | G06F 17/30598 |
| | | | 711/108 |

FOREIGN PATENT DOCUMENTS

| | | |
|---|---|---|
| WO | 2013016514 A1 | 1/2013 |
| WO | 2013026095 A1 | 2/2013 |

OTHER PUBLICATIONS

List of IBM Patents or Patent Applications Treated as Related, dated Apr. 21, 2016, 2 pages.
U.S. Appl. No. 14/851,566, filed Sep. 11, 2015, Entitled "Dynamic Problem Statement with Conflict Resolution".
U.S. Appl. No. 14/948,670, filed Nov. 23, 2015, Entitled "Dynamic Problem Channel Constructor".
U.S. Appl. No. 15/091,882, filed Apr. 6, 2016, Entitled "Critical Situation Contribution and Effectiveness Tracker".
U.S. Appl. No. 15/092,036, filed Apr. 6, 2016, Entitled "Critical Situation Contribution and Effectiveness Tracker".

* cited by examiner

REAL-TIME TAGGER

BACKGROUND OF THE INVENTION

The present invention relates generally to the field of incident management, and more particularly to providing dynamic, real-time social tagging for problem resolution that works across multiple collaboration channels and dynamically shares relevant information with associated tags.

Incident management is a term describing the activities of an organization to identify, analyze, and correct hazards to prevent a future reoccurrence. An incident is an event that could lead to loss of, or disruption to, an organization's operations, services, or functions. If not managed, an incident can escalate into an emergency, a crisis, or a disaster. Incident management is, therefore, the process of limiting the potential disruption caused by such an event, followed by a return to business as usual. Without effective incident management, an incident can rapidly disrupt business operations, information security, information technology (IT) systems, employees or customers, and other vital business functions.

SUMMARY

Aspects of an embodiment of the present invention disclose a method, computer program product, and computing system for providing tagging for problem resolution that works across multiple collaboration channels. A processor receives an indication of a problem statement. A processor monitors a collaboration channel for a new tag. A processor analyzes the new tag to determine a type of tag. A processor sends a notification of the new tag to the collaboration channel. A processor stores the new tag to a database of tags. A processor forms a cluster of correlated tags. A processor sends a notification of the cluster of correlated tags and a recommended action. A processor monitors the collaboration channel for an information request. A processor matches the information request with at least one tag in the database. A processor sends a notification of matches of the information request with the at least one tag found to the collaboration channel. A processor updates the tags with received information.

DETAILED DESCRIPTION

Figure 1:
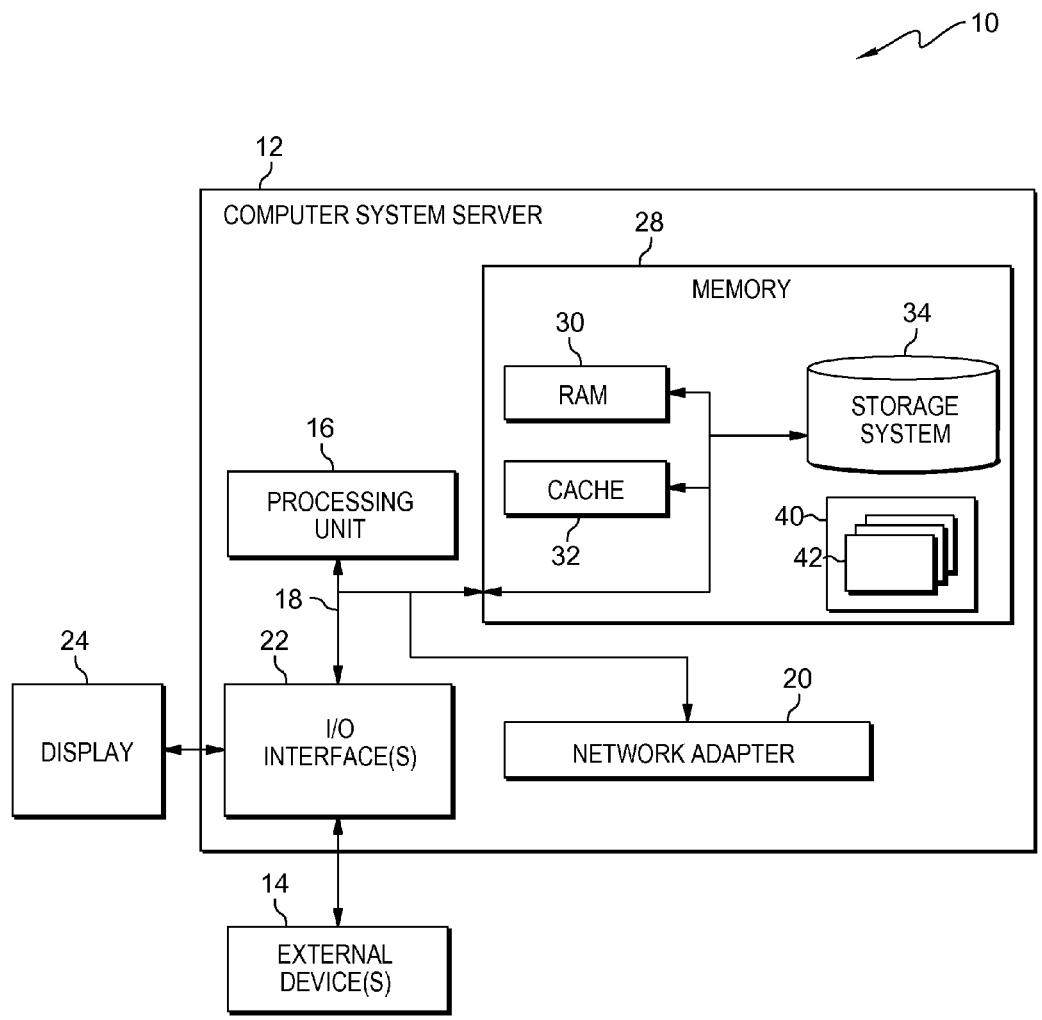
FIG. 1 depicts a block diagram according to an embodiment of the present invention.

During an information technology (IT) incident or a critical situation involving any breakdown of an IT component involving a large scale outage, one of the preliminary steps to be performed is the problem definition (i.e., to define the problem and its associated sub-problems that need to be resolved in order to restore the IT incident or normalcy of operations).

Embodiments of the present invention recognize the need to automatically and dynamically process tags for generating meaningful information, sharing the information to relevant people across multiple problem resolution and collaboration channels. Thus, embodiments of the present invention recognize that information relevant to resolving a problem takes too long to get to the right people and this results in delayed and ineffective problem resolution. Due to the current state of incident management, embodiments of the present invention recognize the need to provide dynamic, real-time social tagging for problem resolution that works across multiple collaboration channels and dynamically share relevant information with associated tags.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
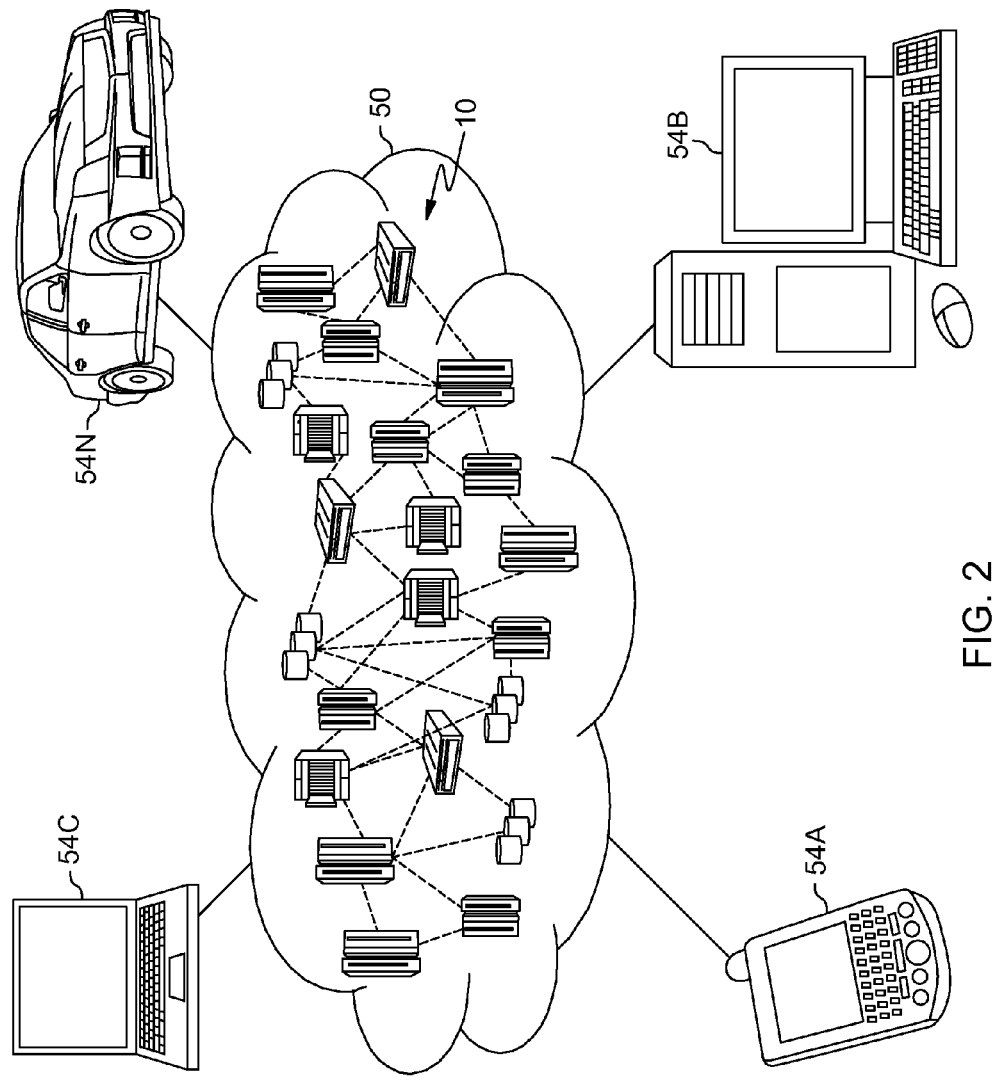
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
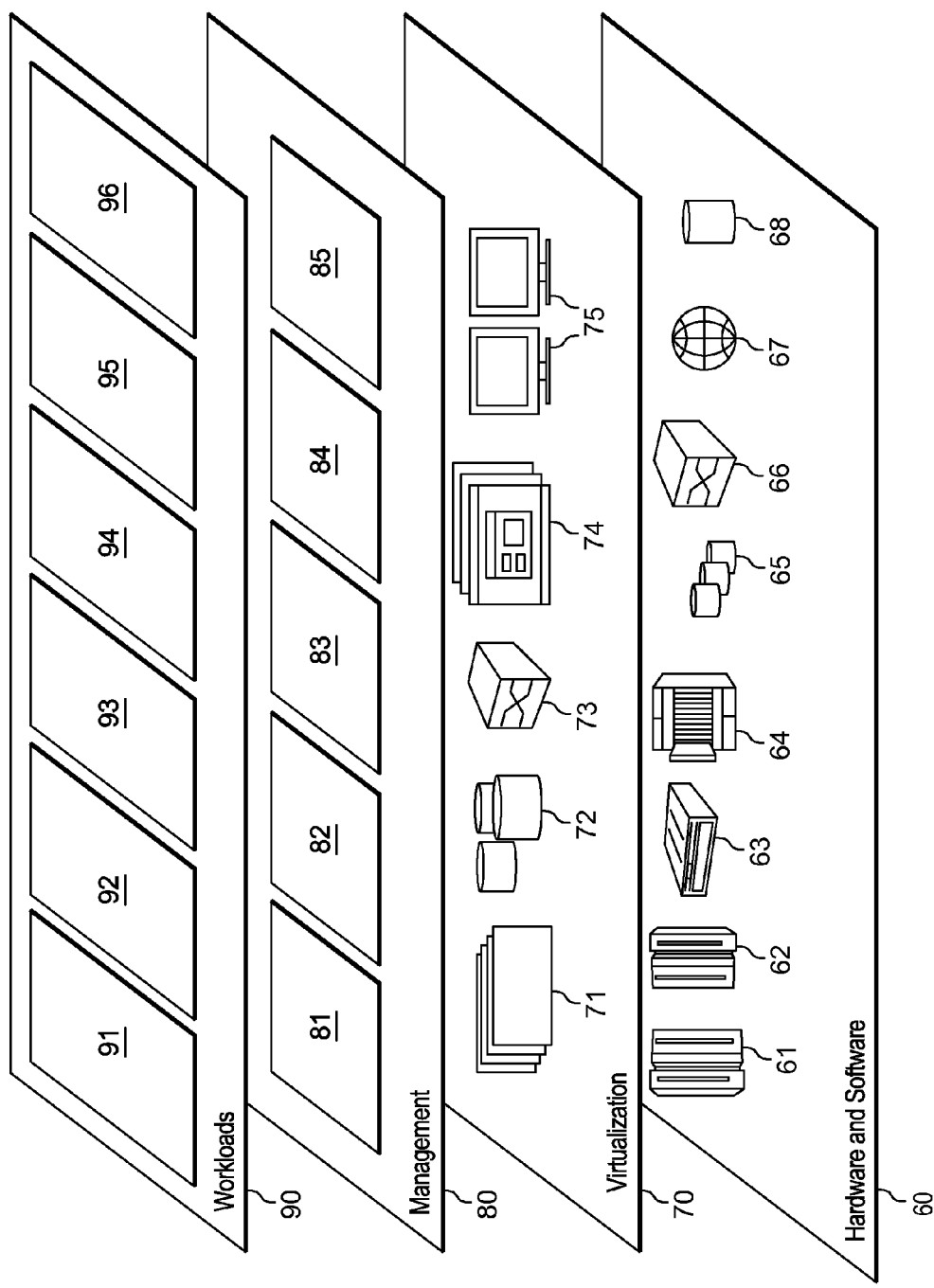
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and master tagger program 96 and/or channel tagger program 96.

Figure 4:
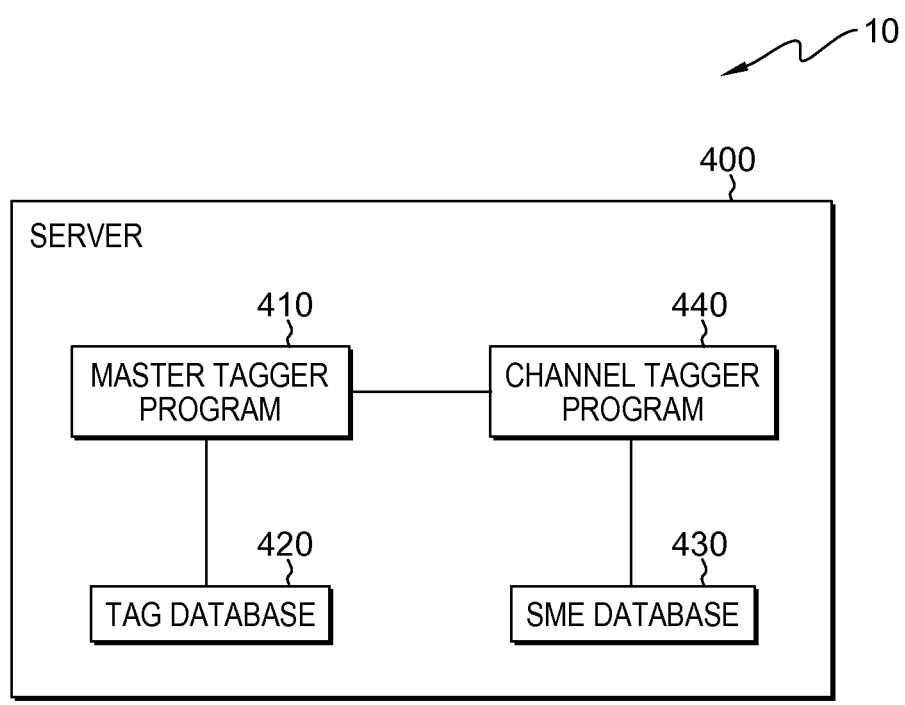
FIG. 4 depicts a block diagram of a computing system according to an embodiment of the present invention.

Referring now to FIG. 4, a diagram of a server 400 in cloud computing node 10 is shown, in accordance with one embodiment of the present invention. FIG. 4 provides an illustration of one embodiment and does not imply any limitations with regard to the environments in which different embodiments can be implemented.

In the depicted embodiment, server 400 contains master tagger program 410, tag database 420, SME database 430, and channel tagger program 440. Server 400 can include components as depicted and described in further detail with respect to FIG. 1.

Working within workloads layer 90 in FIG. 3, master tagger program 410 operates to provide dynamic, real-time social tagging for problem resolution that works across multiple collaboration channels and dynamically shares relevant information with associated tags. In doing so, master tagger program 410 receives an indication of a problem statement. Master tagger program 410 receives a list of current collaboration channels related to the problem statement. Master tagger program 410 monitors for any new or updated tags. Master tagger program 410 determines there are new or updated tags. Master tagger program 410 analyzes the new or updated tags. Master tagger program 410 sends notification of the latest tags. Master tagger program 410 stores the tags to a database and analyzes the tags in the database to form clusters of correlated tags. Master tagger program 410 determines there are collaboration channels that need to be notified. Master tagger program 410 sends notification of the tag cluster and recommended actions. Master tagger program 410 monitors for information requests. Master tagger program 410 determines there are new information requests. Master tagger program 410 matches information requests with tags in the database. Master tagger program 410 sends notification of the matches found. Master tagger program 410 updates the tags. In the depicted embodiment, master tagger program 410 resides on server 400. In other embodiments, master tagger program 410, or similar programs, can reside on another server or another computing device, provided that master tagger program 410 has access to tag database 420 and SME database 430.

Additionally, working within workloads layer 90 in FIG. 3, channel tagger program 440 operates to provide assistance in dynamic, real-time social tagging for problem resolution that works across multiple collaboration channels and dynamically shares relevant information with associated tags. In doing so, channel tagger program 440 retrieves collaboration channel information. Channel tagger program 440 retrieves a list of SMEs working in the collaboration channel. Channel tagger program 440 notifies SMEs of the option to create tags and to request information. Channel tagger program 440 monitors the collaboration channels for any new or updated tags. Channel tagger program 440 determines there are new or updated tags. Channel tagger program 440 retrieves and sends new or updated tags. Channel tagger program 440 monitors the collaboration channels for information requests. Channel tagger program 440 determines there are new information requests. Channel tagger program 440 retrieves and sends information requests. Channel tagger program 440 determines there are notifications received. Channel tagger program 440 translates for the current collaboration channel and notifies relevant SMEs in the collaboration channel. In the depicted embodiment, channel tagger program 440 resides on server 400. In other embodiments, channel tagger program 440, or similar programs, can reside on another server or another computing device, provided that channel tagger program 440 has access to tag database 420 and SME database 430.

Tag database 420 can be a repository that can be written to or read by master tagger program 410 and channel tagger 440. In one embodiment, a program (not shown) can allow a user to define various actions that can resolve various conflicts within a problem statement and store to tag database 420. In some embodiments, tag database 420 can store actions that are defined within another program. In other embodiments, tag database 420 can store actions that were previously analyzed and placed into a certain category of solutions. In some embodiments, tag database 420 can store keywords and tags associated with a problem statement. In the depicted embodiment, tag database 420 resides on server 400. In other embodiments, tag database 420, or similar databases, can reside on another server or another computing device, provided that tag database 420 is accessible to master tagger program 410 and channel tagger program 440 over a network.

SME database 430 can be a repository that can be written to or read by master tagger program 410 and channel tagger program 440. In one embodiment, a program (not shown) can allow a user to define various SMEs with their respective skills and availabilities and store the information to SME database 430. In the depicted embodiment, SME database 430 resides on server 400. In other embodiments, SME database 430, or similar databases, can reside on another server or another computing device, provided that SME database 430 is accessible to master tagger program 410 and channel tagger program 440 over a network.

Figure 5:
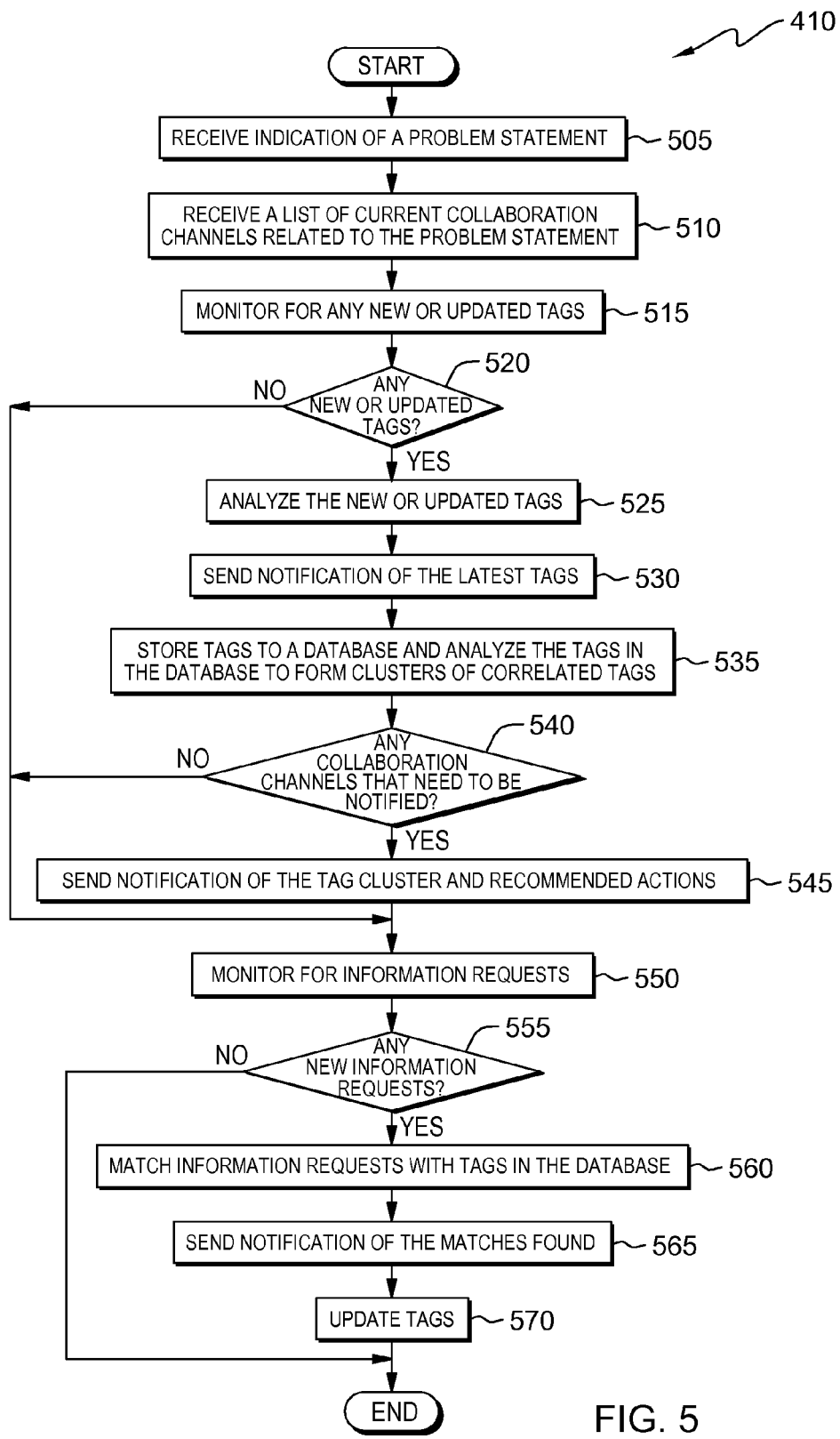
FIG. 5 depicts a flowchart of the steps of a master tagger program, executing within the computing system of FIG. 4, for providing dynamic, real-time social tagging for problem resolution that works across multiple collaboration channels and dynamically shares relevant information with associated tags.

Referring now to FIG. 5, a flowchart of the steps of a master tagger program is shown, executing within the computing system of FIG. 4, in accordance with an embodiment of the present invention. Master tagger program 410 operates to provide dynamic, real-time social tagging for problem resolution that works across multiple collaboration channels and dynamically shares relevant information with associated tags.

In step 505, master tagger program 410 receives an indication of a problem statement. In one embodiment, master tagger program 410 receives an indication of a problem statement by receiving an initial problem from a ticketing or incident management system. In other embodiments, master tagger program 410 receives an indication of a problem statement by receiving an initial problem from a manual entry by an incident manager or critical situation manager. In some embodiments, master tagger program 410 receives an indication of an associated tree of sub-problem statements and each sub-problem can be broken into new sub-problems at any stage by any authorized participant.

In one embodiment, the initial problem statement includes a statement of the problem. In other embodiments, the initial problem statement includes the service level or business impact of the problem. In some embodiments, the initial problem statement includes keywords and tags that are associated with the problem. In some embodiments, the keywords and tags are stored to tag database 420. Still, in other embodiments, the initial problem statement includes a statement of the problem, the service level or business impact of the problem, and key actions and social collaboration channels being launched to resolve the problem.

In step 510, master tagger program 410 receives a list of current collaboration channels related to the problem statement. In one embodiment, master tagger program 410 receives a list of current collaboration channels related to the problem statement from channel tagger program 440. In other embodiments, master tagger program 410 receives a list of current collaboration channels related to the problem statement from a database that stores previous problem statements and associated collaboration channels. If the current problem statement is similar to a previous problem statement in the database, then master tagger program 410 can use the collaboration channels that were associated with the previous problem statement for the current problem statement.

In step 515, master tagger program 410 monitors for any new or updated tags. In one embodiment, master tagger program 410 monitors channel tagger program 440 for updates of any new or updated tags. In other embodiments, master tagger program 410 monitors the collaboration channels for any new or updated tags.

In decision 520, master tagger program 410 determines whether there are any new or updated tags. Master tagger program 410 makes the determination by receiving new or updated tags. If master tagger program 410 determines that there are no new or updated tags (decision 520, no branch), master tagger program 410 monitors for information requests (step 550). If master tagger program 410 determines that there are new or updated tags (decision 520, yes branch), master tagger program 410 analyzes the new or updated tags (step 525).

In step 525, master tagger program 410 analyzes the new or updated tags. In one embodiment, master tagger program 410 analyzes the new or updated tags received from channel tagger program 440 to determine the type of tag. For example, the tag may be, but is not limited to: (a) a tag indicating relevant people for resolving a sub-problem; (b) a tag about the status update on a sub-problem, such as resolution progress or increase in severity level of the issue; or (c) information relevant to a sub-problem, such as links to technical documentation about a relevant product. In other embodiments, master tagger program 410 analyzes the new or updated tags to determine the tags' greatest use. In some embodiments, master tagger program 410 analyzes the new or updated tags to determine the relevance of the tag to specific portions of the problem tree, to specific individuals or groups working on the problem, and to specific collaboration channels associated with the problem.

In step 530, master tagger program 410 sends a notification of the latest tags. In one embodiment, master tagger program 410 sends a notification of the latest tags to channel tagger program 440. In other embodiments, master tagger program 410 sends a notification of the latest tags to the collaboration channel. In some embodiments, master tagger program 410 sends a notification of the latest tags, directly, to the subject matter experts (SMEs) associated with the collaboration channel.

For example, if an SME working in one of the collaboration channels has the latest status of a storage device in a network and captures this status data along with the tag "one drive in storage device XYZ is back up," master tagger program 410 automatically propagates the tag information to the channel tagger program 440 associated with the sub-tree associated with the tagged collaboration channel. Also, master tagger program 410 searches the rest of the collaboration channels working on problems related to the storage device, or where there is a storage SME working, or if there has been an earlier request for information on the storage device and notifies the corresponding channel tagger program 440 with the tag, as well as the snippet of data associated with the tag.

In step 535, master tagger program 410 stores tags to a database and analyzes the tags in the database to form clusters of correlated tags. In one embodiment, master tagger program 410 stores the tags to tag database 420 and updates tag database 420, which includes tags received from each channel tagger program 440. In other embodiments, master tagger program 410 analyzes the tags in tag database 420 to form clusters of correlated tags. The clusters of correlated tags are also classified into tag cluster types, such as: relevant information; change in problem status, which includes increased or decreased criticality levels and progress in problem resolution; and relevant people for particular problem areas; etc. In some embodiments, master tagger program 410 associates recommended actions with each tag cluster based on the type of cluster, the status associated with the cluster, the level of expertise of people associated with the cluster, the currency and the ratings of the information in the cluster, etc. For example, a cluster of tags may be associated with the resolution of a storage device problem. The recommended action associated with the cluster could be to "mark storage device problem as resolved." The tag cluster and the recommended action would be notified to the relevant collaboration channels (as in step 545).

In decision 540, master tagger program 410 determines whether any collaboration channels need to be notified. Master tagger program 410 makes the determination from the analysis of the clusters of correlated tags that was performed in step 535. If master tagger program 410 determines that no collaboration channels need to be notified (decision 540, no branch), master tagger program 410 monitors for information requests (step 550). If master tagger program 410 determines that there are collaboration channels that need to be notified (decision 540, yes branch), master tagger program 410 sends notification of the tag cluster and recommended actions (step 545).

In step 545, master tagger program 410 sends notification of the tag cluster and recommended actions. In one embodiment, master tagger program 410 sends notification of the tag cluster and recommended actions to channel tagger program 440. In other embodiments, master tagger program 410 sends notification of the tag cluster and recommended actions to the relevant collaboration channels. In some embodiments, master tagger program 410 sends notification of the tag cluster and recommended actions, directly, to the relevant people associated with the relevant collaboration channels.

In step 550, master tagger program 410 monitors for information requests. In one embodiment, master tagger program 410 monitors channel tagger program 440 for information requests. In other embodiments, master tagger program 410 monitors the collaboration channels for information requests. Step 550 enables any SME working in any of the collaboration channels to post a request for information, such as "looking for status of network switch ABC" or "need an expert on EFG technology."

In decision 555, master tagger program 410 determines whether there are any new information requests. Master tagger program 410 makes the determination by receiving information requests. If master tagger program 410 determines there are no new information requests (decision 555, no branch), master tagger program 410 ends. If master tagger program 410 determines there are new information requests (decision 555, yes branch), master tagger program 410 matches information requests with tags in the database.

In step 560, master tagger program 410 matches information requests with tags in the database. In one embodiment, master tagger program 410 identifies potential SMEs to be notified about an information request by matching the information request with: (a) the skill sets of the SMEs currently working in the different collaboration channels; (b) responsiveness rating of the SME based on previous response history; and (c) information benefit rating of the SME based on the responses received in the past for the SME's own information requests. In other embodiments, master tagger program 410 updates SME responsiveness and information benefit ratings based on the latest information request and response activity. In some embodiments, any new response tags from an information request are propagated back to the original requesting SME.

In step 565, master tagger program 410 sends a notification of the matches found. In one embodiment, master tagger program 410 sends a notification of the matches found to channel tagger program 440. In other embodiments, master tagger program 410 sends a notification of the matches found to the relevant collaboration channels. In some embodiments, master tagger program 410 sends a notification of the matches found, directly, to the relevant SMEs associated with the relevant collaboration channels.

In one embodiment, master tagger program 410 updates the tags (step 570). In some embodiments, master tagger program 410 loops back to step 510 until the current problem is resolved and no problem tree or collaboration channels exist for the current problem. In some embodiments, master tagger program 410 ends.

Figure 6:
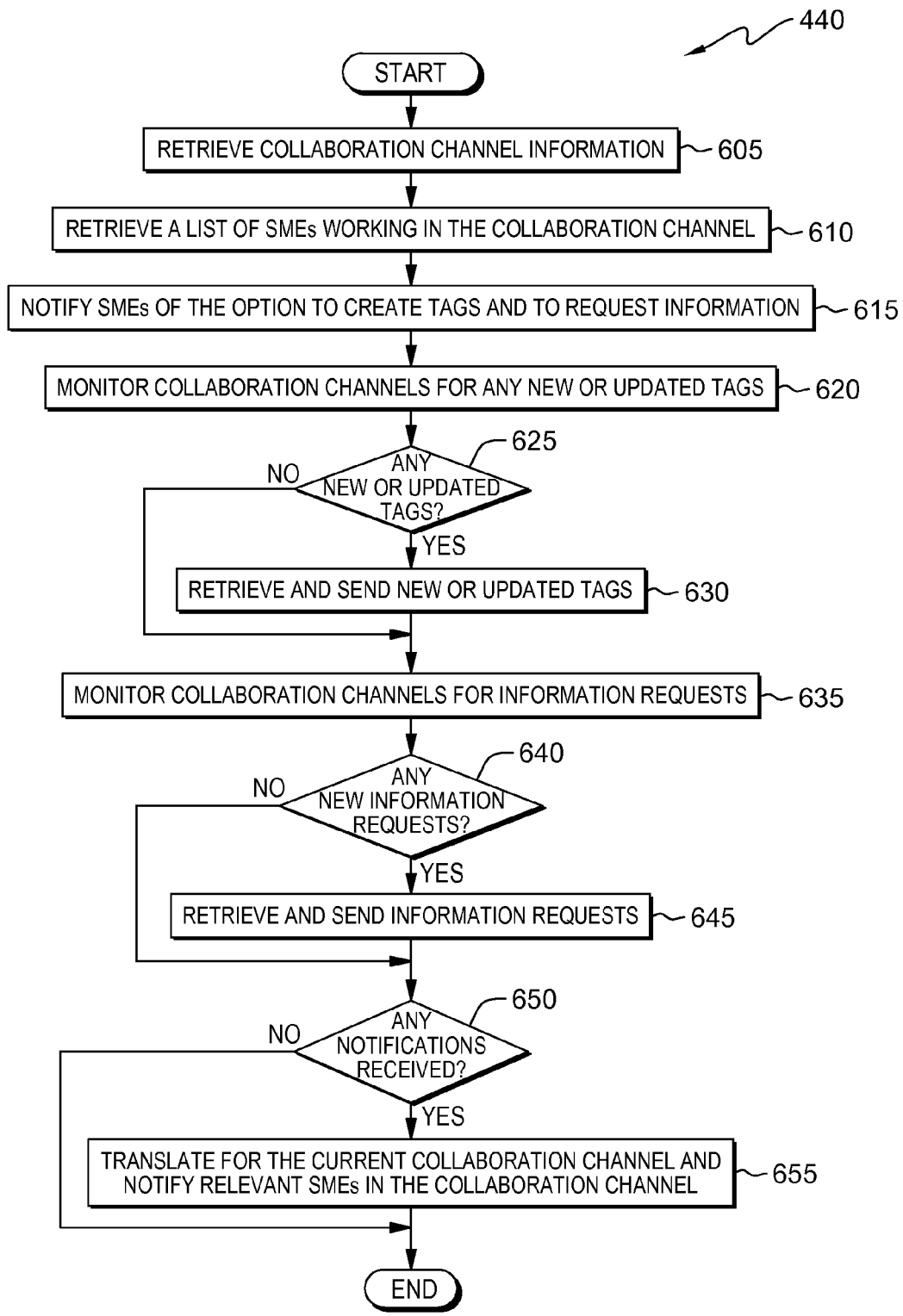
FIG. 6 depicts a flowchart of the steps of a channel tagger program, executing within the computing system of FIG. 4, for providing assistance in dynamic, real-time social tagging for problem resolution that works across multiple collaboration channels and dynamically shares relevant information with associated tags.

Additionally, referring now to FIG. 6, a flowchart of the steps of a channel tagger program is shown, executing within the computing system of FIG. 4, in accordance with an embodiment of the present invention. Channel tagger program 440 operates to provide assistance in dynamic, real-time social tagging for problem resolution that works across multiple collaboration channels and dynamically shares relevant information with associated tags.

In step 605, channel tagger program 440 retrieves collaboration channel information. In one embodiment, channel tagger program 440 retrieves the most current collaboration channel information, including the associated sub-problem title and definition, medium of collaboration, and collaboration channel properties (e.g., notification mechanisms supported, display properties, etc.). In other embodiments, channel tagger program 440 retrieves the collaboration channel information from a previous, similar problem statement.

In step 610, channel tagger program 440 retrieves a list of SMEs working in the collaboration channel. The SMEs are generally involved in the collaboration channel, but might not be logged in at the present time. In one embodiment, channel tagger program 440 retrieves a list of SMEs working in the collaboration channel from SME database 430. In other embodiments (not shown), channel tagger program 440 creates a list of SMEs that are relevant for the collaboration channel.

In step 615, channel tagger program 440 notifies SMEs of the option to create tags and to request information. In one embodiment, channel tagger program 440 notifies SMEs of the option to create tags and to request information by presenting tag creation and information request options to all new SMEs in the collaboration channel through an appropriate display mode for the collaboration channel. In other embodiments, channel tagger program 440 notifies SMEs, individually, of the option to create tags and to request information. In some embodiments, channel tagger program 440 notifies SMEs, in groups, of the option to create tags and to request information.

In step 620, channel tagger program 440 monitors the collaboration channels for any new or updated tags. In one embodiment, channel tagger program 440 monitors the collaboration channels, as a whole, for any new or updated tags. In other embodiments, channel tagger program 440 monitors a particular SME in a collaboration channel for any new or updated tags. In some embodiments, channel tagger program 440 monitors a group of SMEs in a collaboration channel for any new or updated tags.

In decision 625, channel tagger program 440 determines whether there are any new or updated tags. Channel tagger program 440 makes the determination by receiving an indication that there are new or updated tags. In one embodiment, channel tagger program 440 receives an indication that there are new or updated tags from the collaboration channel. In other embodiments, channel tagger program 440 receives an indication that there are new or updated tags from master tagger program 410. If channel tagger program 440 determines there are no new or updated tags (decision 625, no branch), channel tagger program 440 monitors collaboration channels for information requests (step 635). If channel tagger program 440 determines there are new or updated tags (decision 625, yes branch), channel tagger program 440 retrieves and sends new or updated tags (step 630).

In step 630, channel tagger program 440 retrieves and sends new or updated tags. In one embodiment, channel tagger program 440 retrieves new or updated tags from the collaboration channel. In other embodiments channel tagger program 440 sends new or updated tags to master tagger program 410. In some embodiments, channel tagger program 440 retrieves new or updated tags from the collaboration channel and sends the new or updated tags to master tagger program 410.

In step 635, channel tagger program 440 monitors the collaboration channels for information requests. In one embodiment, channel tagger program 440 monitors the collaboration channels, as a whole, for information requests. In other embodiments, channel tagger program 440 monitors a particular SME in a collaboration channel for information requests. In some embodiments, channel tagger program 440 monitors a group of SMEs in a collaboration channel for information requests.

In decision 640, channel tagger program 440 determines whether there are any new information requests. Channel tagger program 440 makes the determination by receiving indication of information requests. If channel tagger program 440 determines there are no new information requests (decision 640, no branch), channel tagger program 440 determines whether any notifications are received (decision 650). If channel tagger program 440 determines there are new information requests (decision 640, yes branch), channel tagger program 440 retrieves and sends the information requests (step 645).

In step 645, channel tagger program 440 retrieves and sends information requests. In one embodiment, channel tagger program 440 retrieves the information requests from the collaboration channel. In other embodiments, channel tagger program 440 sends the information requests to master tagger program 410. In some embodiments, channel tagger program 440 retrieves the information requests from the collaboration channel and sends the information requests to master tagger program 410.

In decision 650, channel tagger program 440 determines whether any notifications are received. Channel tagger program 440 checks for any new tag notifications, tag cluster notifications, recommended action notifications, and information request notifications from master tagger program 410. Channel tagger program 440 makes the determination by notifications received from master tagger program 410. If channel tagger program 440 determines that no notifications are received (decision 650, no branch), channel tagger program 440 ends. If channel tagger program 440 determines that notifications are received (decision 650, yes branch), channel tagger program 440 translates the notifications for the current collaboration channel and notifies relevant SMEs in the collaboration channel.

In step 655, channel tagger program 440 translates for the current collaboration channel and notifies relevant SMEs in the collaboration channel. In one embodiment, channel tagger program 440 translates by transcoding the tags, tag clusters, recommended actions, and information requests to suit the current collaboration channel. In other embodiments, channel tagger program 440 notifies relevant SMEs in the collaboration channel of the latest tags, tag clusters, recommended actions, and information requests. In some embodiments, channel tagger program 440 transcodes the tags, tag clusters, recommended actions, and information requests to suit the current collaboration channel and notifies relevant SMEs in the collaboration channel of the latest tags, tag clusters, recommended actions, and information requests.

In one embodiment, channel tagger program 440 loops back to step 605 until the current problem is resolved and no problem tree or collaboration channels exist for the current problem. In other embodiments, channel tagger program 440 ends.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing tagging for problem resolution that works across multiple collaboration channels, the method comprising the steps of:
creating, by one or more processors, a plurality of lists of subject matter experts for a plurality of collaboration channels, based on an expertise of the subject matter experts;
receiving, by one or more processors, an indication of a problem statement, wherein the problem statement includes tags, a problem, collaboration channel information, and subject matter experts within the plurality of lists of subject matter experts associated with a collaboration channel associated with the problem statement within the plurality of collaboration channels, wherein the problem is an information technology incident involving a breakdown of an information technology component, wherein the collaboration channel information includes collaboration channel information from a previous problem statement, an associated sub-problem title and definition, a medium of collaboration, and collaboration channel properties, and wherein the collaboration channel properties include notification mechanisms supported and display properties;
receiving, by one or more processors, an indication of a tree of sub-problem statements associated with the problem statement that can be broken down into new sub-problem statements at any stage by the subject matter experts;
notifying, by one or more processors, the subject matter experts of the option to create tags and to request information, wherein the notification comprises: presenting tag creation and information request options to the subject matter experts in the collaboration channel through a display associated with the collaboration channel;
monitoring, by one or more processors, the collaboration channel for a new tag, wherein the collaboration channel includes a tagging mechanism;
subsequent to determining there is a new tag, retrieving the new tag from the collaboration channel;
analyzing, by one or more processors, the new tag to determine a type of tag, wherein the type of tag is a tag indicating relevant people for resolving the problem, a status update on the problem, and information relevant to the problem, wherein the relevant people includes the subject matter experts, and wherein the problem includes the problem and a sub-problem;
storing, by one or more processors, the new tag to a database of tags;
forming, by one or more processors, a cluster of correlated tags;
sending, by one or more processors, a notification of the cluster of correlated tags and a recommended action, wherein the recommended action is a resolution to the problem, and wherein the recommended action is based on matching one or more tags within the cluster of correlated tags to the type of tag, subject matter experts, and information associated with a collaboration channel;
monitoring, by one or more processors, the collaboration channel for an information request;
matching, by one or more processors, the information request with at least one tag in the database;
sending, by one or more processors, a notification of matches of the information request with the at least one tag found to the collaboration channel; and
updating, by one or more processors, the tags with received information.

2. The method of claim 1, wherein the problem statement includes collaboration channel information and subject matter experts associated with the collaboration channel, wherein the collaboration channel information includes an associated sub-problem title and definition, a medium of collaboration, and collaboration channel properties.

3. The method of claim 1, wherein the type of tag is selected from the group consisting of a tag indicating relevant people for resolving a problem or sub-problem, a tag indicating a status update on a problem or sub-problem, and a tag indicating information relevant to a problem or sub-problem, and wherein the relevant people includes a subject matter expert.

4. The method of claim 1, wherein the cluster of correlated tags are classified according to a classification selected from the group consisting of relevant information, change in problem status, and relevant people for particular problems.

5. The method of claim 1, further comprising:
transcoding, by one or more processors, at least one of the tags, the cluster of correlated tags, the recommended action, and the information request, to suit a current collaboration channel.

6. The method of claim 1, further comprising:
enabling, by one or more processors, a subject matter expert to post an information request within a collaboration channel and to find an existing tag within the collaboration channel that is relevant to the information request.

7. The method of claim 1, further comprising:
initiating, by one or more processors, a tagger within each collaboration channel, wherein the tagger is a tagging instrument and shares relevant information with associated tags.

8. A computer program product for providing tagging for problem resolution that works across multiple collaboration channels, the computer program product comprising:
one or more computer readable storage media, wherein the one or more computer readable storage media is not a transitory signal per se, and program instructions stored on the one or more computer readable storage media, the program instructions comprising:
program instructions to create a plurality of lists of subject matter experts for a plurality of collaboration channels, based on an expertise of the subject matter experts;
program instructions to receive an indication of a problem statement, wherein the problem statement includes tags, a problem, collaboration channel information, and subject matter experts within the plurality of lists of subject matter experts associated with a collaboration channel associated with the problem statement within the plurality of collaboration channels, wherein the problem is an information technology incident involving a breakdown of an information technology component, wherein the collaboration channel information includes collaboration channel information from a previous problem statement, an associated sub-problem title and definition, a medium of collaboration, and collaboration channel properties, and wherein the collaboration channel properties include notification mechanisms supported and display properties;

program instructions to receive an indication of a tree of sub-problem statements associated with the problem statement that can be broken down into new sub-problem statements at any stage by the subject matter experts;

program instructions to notify the subject matter experts of the option to create tags and to request information, wherein the notification comprises: presenting tag creation and information request options to the subject matter experts in the collaboration channel through a display associated with the collaboration channel;

program instructions to monitor the collaboration channel for a new tag, wherein the collaboration channel includes a tagging mechanism;

subsequent to determining there is a new tag, program instructions to retrieve the new tag from the collaboration channel;

program instructions to analyze the new tag to determine a type of tag, wherein the type of tag is a tag indicating relevant people for resolving the problem, a status update on the problem, and information relevant to the problem, wherein the relevant people includes the subject matter experts, and wherein the problem includes the problem and a sub-problem;

program instructions to store the new tag to a database of tags;

program instructions to form a cluster of correlated tags;

program instructions to send a notification of the cluster of correlated tags and a recommended action, wherein the recommended action is a resolution to the problem, and wherein the recommended action is based on matching one or more tags within the cluster of correlated tags to the type of tag, subject matter experts, and information associated with a collaboration channel;

program instructions to monitor the collaboration channel for an information request;

program instructions to match the information request with at least one tag in the database;

program instructions to send a notification of matches of the information request with the at least one tag found to the collaboration channel; and program instructions to update the tags with received information.

9. The computer program product of claim 8, wherein the problem statement includes collaboration channel information and subject matter experts associated with the collaboration channel, wherein the collaboration channel information includes an associated sub-problem title and definition, a medium of collaboration, and collaboration channel properties.

10. The computer program product of claim 8, wherein the type of tag is selected from the group consisting of a tag indicating relevant people for resolving a problem or sub-problem, a tag indicating a status update on a problem or sub-problem, and a tag indicating information relevant to a problem or sub-problem, and wherein the relevant people includes a subject matter expert.

11. The computer program product of claim 8, wherein the cluster of correlated tags are classified according to a classification selected from the group consisting of relevant information, change in problem status, and relevant people for particular problems.

12. The computer program product of claim 8, further comprising:

program instructions, stored on the one or more computer readable storage media, to transcode at least one of the tags, the cluster of correlated tags, the recommended action, and the information request, to suit a current collaboration channel.

13. The computer program product of claim 8, further comprising:

program instructions, stored on the one or more computer readable storage media, to enable a subject matter expert to post an information request within a collaboration channel and to find an existing tag within the collaboration channel that is relevant to the information request.

14. The computer program product of claim 8, further comprising:

program instructions, stored on the one or more computer readable storage media, to initiate a tagger within each collaboration channel, wherein the tagger is a tagging instrument and shares relevant information with associated tags.

15. A computer system for providing tagging for problem resolution that works across multiple collaboration channels, the computer system comprising:

a computer processor, a computer readable storage medium, wherein the computer readable storage medium is not a transitory signal per se, and program instructions stored on the computer readable storage medium for execution by the computer processor, the program instructions comprising:

program instructions to create a plurality of lists of subject matter experts for a plurality of collaboration channels, based on an expertise of the subject matter experts;

program instructions to receive an indication of a problem statement, wherein the problem statement includes tags, a problem, collaboration channel information, and subject matter experts within the plurality of lists of subject matter experts associated with a collaboration channel associated with the problem statement within the plurality of collaboration channels, wherein the problem is an information technology incident involving a breakdown of an information technology component, wherein the collaboration channel information includes collaboration channel information from a previous problem statement, an associated sub-problem title and definition, a medium of collaboration, and collaboration channel properties, and wherein the collaboration channel properties include notification mechanisms supported and display properties;

program instructions to receive an indication of a tree of sub-problem statements associated with the problem statement that can be broken down into new sub-problem statements at any stage by the subject matter experts;

program instructions to notify the subject matter experts of the option to create tags and to request information, wherein the notification comprises: presenting tag creation and information request options to the subject matter experts in the collaboration channel through a display associated with the collaboration channel;

program instructions to monitor the collaboration channel for a new tag, wherein the collaboration channel includes a tagging mechanism;

subsequent to determining there is a new tag, program instructions to retrieve the new tag from the collaboration channel;

program instructions to analyze the new tag to determine a type of tag, wherein the type of tag is a tag indicating relevant people for resolving the problem, a status update on the problem, and information relevant to the problem, wherein the relevant people includes the subject matter experts, and wherein the problem includes the problem and a sub-problem;

program instructions to store the new tag to a database of tags;

program instructions to form a cluster of correlated tags;

program instructions to send a notification of the cluster of correlated tags and a recommended action, wherein the recommended action is a resolution to the problem, and wherein the recommended action is based on matching one or more tags within the cluster of correlated tags to the type of tag, subject matter experts, and information associated with a collaboration channel;

program instructions to monitor the collaboration channel for an information request;

program instructions to match the information request with at least one tag in the database;

program instructions to send a notification of matches of the information request with the at least one tag found to the collaboration channel; and program instructions to update the tags with received information.

16. The computer system of claim 15, wherein the problem statement includes collaboration channel information and subject matter experts associated with the collaboration channel, wherein the collaboration channel information includes an associated sub-problem title and definition, a medium of collaboration, and collaboration channel properties.

17. The computer system of claim 15, wherein the type of tag is selected from the group consisting of a tag indicating relevant people for resolving a problem or sub-problem, a tag indicating a status update on a problem or sub-problem, and a tag indicating information relevant to a problem or sub-problem, and wherein the relevant people includes a subject matter expert.

18. The computer system of claim 15, wherein the cluster of correlated tags are classified according to a classification selected from the group consisting of relevant information, change in problem status, and relevant people for particular problems.

19. The computer system of claim 15, further comprising:
program instructions, stored on the computer readable storage media for execution by at least one of the one or more processors, to transcode at least one of the tags, the cluster of correlated tags, the recommended action, and the information request, to suit a current collaboration channel.

20. The computer system of claim 15, further comprising:
program instructions, stored on the computer readable storage media for execution by at least one of the one or more processors, to enable a subject matter expert to post an information request within a collaboration channel and to find an existing tag within the collaboration channel that is relevant to the information request.

* * * * *